United States Patent
Brown-Wilkinson (10) Patent No.: US 6,695,619 B2
(45) Date of Patent: Feb. 24, 2004

(54) ORTHOPAEDIC DEMONSTRATION AID

(76) Inventor: Oliver Brown-Wilkinson, 34 Newburgh Road, Acton, London W3 6DQ (GB)

( * ) Notice: Subject to any disclaimer, the term of this patent is extended or adjusted under 35 U.S.C. 154(b) by 0 days.

(21) Appl. No.: 10/230,219

(22) Filed: Aug. 29, 2002

(65) Prior Publication Data

US 2003/0104345 A1 Jun. 5, 2003

Related U.S. Application Data

(63) Continuation-in-part of application No. 09/924,473, filed on Aug. 9, 2001, now Pat. No. 6,524,111.

(51) Int. Cl.[7] ............................................... G09B 23/23
(52) U.S. Cl. ..................................... 434/274; 623/18.11
(58) Field of Search ................................ 434/274, 275, 434/262, 267; 623/18.11, 16.11, 908, 20.11, 20.14, 20.35, 22.11

(56) References Cited

U.S. PATENT DOCUMENTS

| | | |
|---|---|---|
| 4,200,995 A | 5/1980 | Trella |
| 4,433,961 A | 2/1984 | Chandler |
| 4,734,039 A | 3/1988 | Thompson |
| 4,838,795 A | 6/1989 | Draenert |
| 5,607,311 A | 3/1997 | Browne-Wilkinson |
| 6,123,729 A * | 9/2000 | Insall et al. ............... 623/20.31 |
| 6,168,629 B1 * | 1/2001 | Timoteo .................... 623/20.27 |
| 6,214,053 B1 | 4/2001 | Ling et al. |

FOREIGN PATENT DOCUMENTS

| | | |
|---|---|---|
| FR | 2621814 | 4/1989 |
| GB | 2 264 190 A | 8/1993 |
| GB | 2 294 573 A | 5/1996 |

* cited by examiner

*Primary Examiner*—Kien T. Nguyen
(74) *Attorney, Agent, or Firm*—Young & Thompson (57) ABSTRACT

An orthopaedic skeletal joint demonstration aid for demonstrating the fitting to a skeletal joint of additional different versions of an orthopaedic prosthesis in different surgical techniques comprises a first facsimile skeletal part including a main portion and at least one detachable portion which is detachable from the main portion to permit fitting of one part of a prosthesis thereto, and a second facsimile skeletal part including an elongate main portion and at least one detachable portion which is detachable from the main portion to permit fitting of another part of the prosthesis thereto. The detachable portions of the second part include a generally box-shaped detachable portion which is detachably received within a slot in the main portion to permit fitting of a version of the prosthesis part which does not incorporate a projecting box section, and which is removable to permit fitting of a version of the prosthesis part which incorporates a projecting box section such that the box section is received within the slot. Such an orthopaedic knee demonstration aid may be used to demonstrate a number of different surgical orthopaedic techniques in knee replacement.

10 Claims, 7 Drawing Sheets

ORTHOPAEDIC DEMONSTRATION AID

BACKGROUND OF THE INVENTION

This invention relates to orthopaedic demonstration aids, and is concerned more particularly, but not exclusively, with orthopaedic hip and knee replacement demonstration aids.

In the medical field it is known to demonstrate surgical techniques using aids specifically provided for this purpose, since it is impractical to rely solely on demonstration of such techniques on the human or animal body. An increasingly important area for demonstration of surgical techniques is hip and knee replacement, and there is a need for an orthopaedic hip replacement demonstration aid which is capable of demonstrating all stages of hip replacement using a single demonstration aid, both for teaching purposes and for demonstration of the techniques to patients.

British Patent No. 2264190 discloses an orthopaedic demonstration aid in the form of a facsimile of the human skeletal knee with full femur and tibia, excluding patella, connected together in the correct anatomical position. Each of the femur and tibia comprises a main portion and a number of detachable pieces connected to the main portion by magnetic attraction. These pieces may be separately detached from the main portions to show different stages of an orthopaedic implant technique, and to accept the correct orthopaedic prosthesis. Once the demonstration has been completed, the prosthesis can be removed and the detachable pieces reattached so as to place the aid in its original state, suitable for reuse.

It is an object of the invention to provide an orthopaedic skeletal joint demonstration aid which is particularly convenient in use and which can be used to demonstrate a number of different surgical techniques.

According to the present invention there is provided an orthopaedic skeletal joint demonstration aid for demonstrating the fitting of an orthopaedic prosthesis to a skeletal joint, the aid comprising a facsimile skeletal part including an elongate main portion incorporating an axial passage, and a detachable sheath portion received within the passage and incorporating a further axial passage adapted to detachably receive a shaft of the prosthesis such that a head of the prosthesis projects from an end of the skeletal part.

Such an orthopaedic skeletal joint demonstration aid may be used to demonstrate surgical orthopaedic techniques in joint replacement, such as in hip, knee, shoulder, digit, wrist, elbow and ankle replacement, both for humans and animals. It may also be used in demonstrating power surgical tools and hand instruments.

SUMMARY OF THE INVENTION

The invention also provides an orthopaedic hip replacement demonstration aid for demonstrating the fitting of an orthopaedic hip replacement prosthesis, the aid comprising a facsimile femur part including an elongate main portion incorporating an axial passage and a joint portion releasably secured toand readily detachable from the main portion to allow fitting of one part of the prosthesis, and a facsimile pelvis part incorporating a socket for receiving either the joint portion or another part of the prosthesis when the joint portion is removed on fitting of the prosthesis.

The invention further provides a skeletal joint demonstration aid for demonstrating the fitting to a skeletal joint of additional different versions of an orthopaedic prosthesis in different surgical techniques, the aid comprising a first facsimile skeletal part including a main portion and having at least one detachable portion which is detachable from the main portion to permit fitting of one part of a prosthesis thereto, and a second facsimile skeletal part including an elongate main portion and having at least one detachable portion which is detachable from the main portion to permit fitting of another part of the prosthesis thereto, wherein the detachable portions of the second part include a generally box-shaped detachable portion which is detachably received within a slot in the main portion to permit fitting of a version of the prosthesis part which does not incorporate a projecting box section and which is removable to permit fitting of a version of the prosthesis part which incorporates a projecting box section such that the box section is received within the slot.

Such a demonstration aid is advantageous both because it can be used to demonstrate the different cuts required in different surgical knee replacement procedures, and because it can be used to demonstrate image guidance surgery (IGS) which is a relatively new surgical technique.

BRIEF DESCRIPTION OF THE DRAWINGS

In order that the invention may be more fully understood, preferred embodiments of the invention will now be described, by way of example, with reference to the accompanying drawings, in which.

DETAILED DESCRIPTION OF THE DRAWINGS

Figure 1:
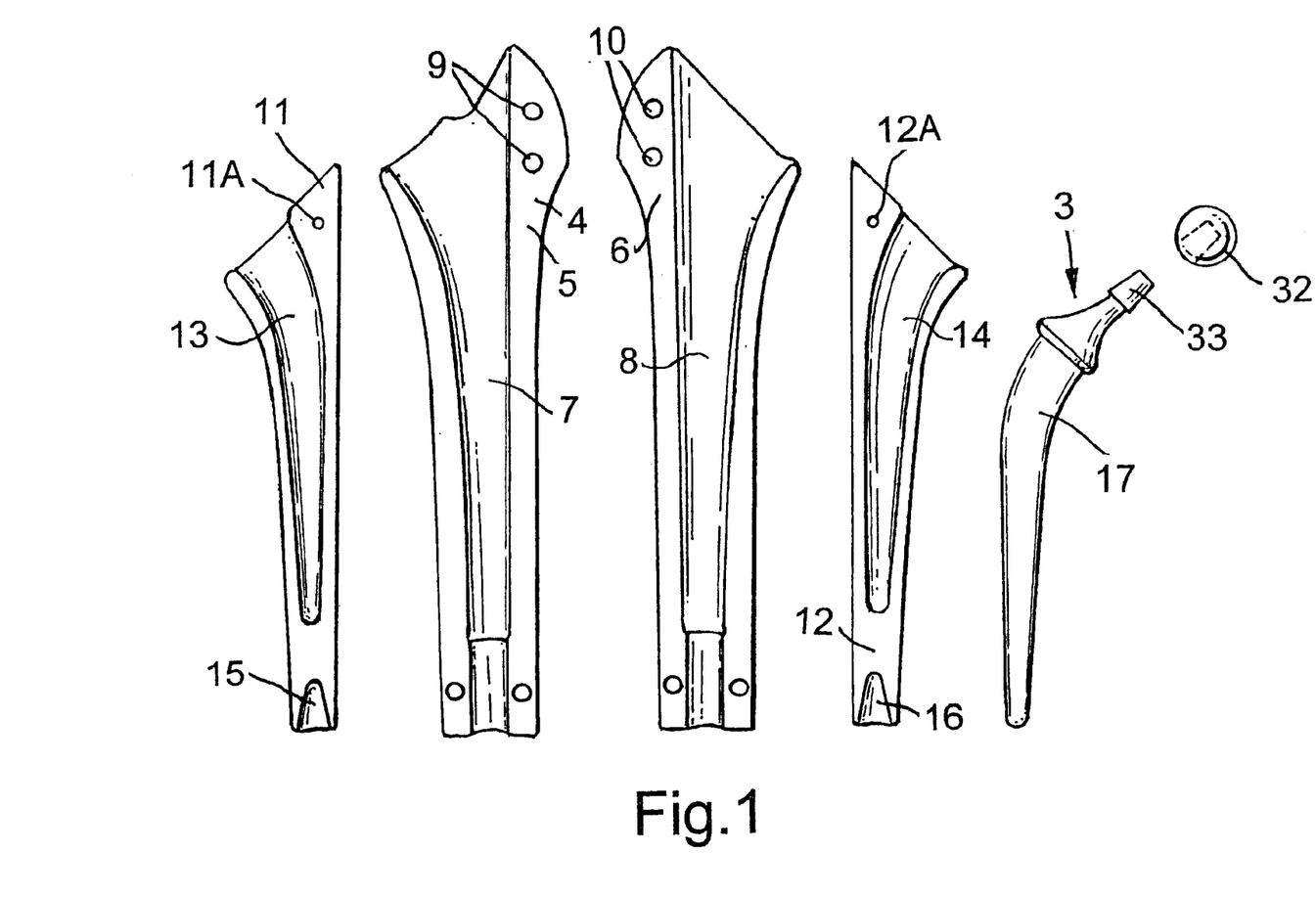
FIG. 1 is a view of disassembled parts of a facsimile femur part, together with a prosthesis.

The first embodiment shown in the drawings is an orthopaedic hip replacement demonstration aid in the form of a facsimile of the human skeletal hip comprising a part of the femur and a part of the pelvis connectable together in the correct anatomical positions. Referring to FIG. 1, a hip replacement prosthesis 3 is shown for connecting together the femur part and the pelvis part after removal of detachable portions of the two parts in a manner mimicking surgical removal of these parts in an actual hip replacement operation. The prosthesis 3 has a shaft portion 17 and a detachable ball portion 32, and the shaft portion 17 is also used for connecting together portions of the femur part prior to detachment of these portions. The ball portion 32 is made detachable so that different sized ball portions can be fitted depending on the requirements of a particular patient.

The femur part is made up of a series of different pieces which are anatomically correct relative to the human hip in its natural form, when put together in the correct order. More particularly the femur part comprises an elongate main portion 4 consisting of two detachable parts 5, 6 having axial channels 7, 8 which together form an axial passage when the two parts 5, 6 are secured together by the magnetic attraction of embedded magnets 9, 10 recessed into the parts 5, 6. In addition the femur part includes a detachable sheath portion received within the actual passage and consisting of two detachable parts 11, 12 having axial channels 13, 14 which together form a further axial passage when the two parts 11, 12 are brought together. The parts 11, 12 are held in the correct positions with respect to one another by the magnetic attraction of embedded magnets 11A, 12A and by virtue of a projection 15 on the part 11 engaging within a recess 16 in the part 12, and the axial passage in the sheath portion accommodates the shaft portion 17 (both when used for connecting together the portions of the femur part and when serving as part of the prosthesis 3).

Figure 2:
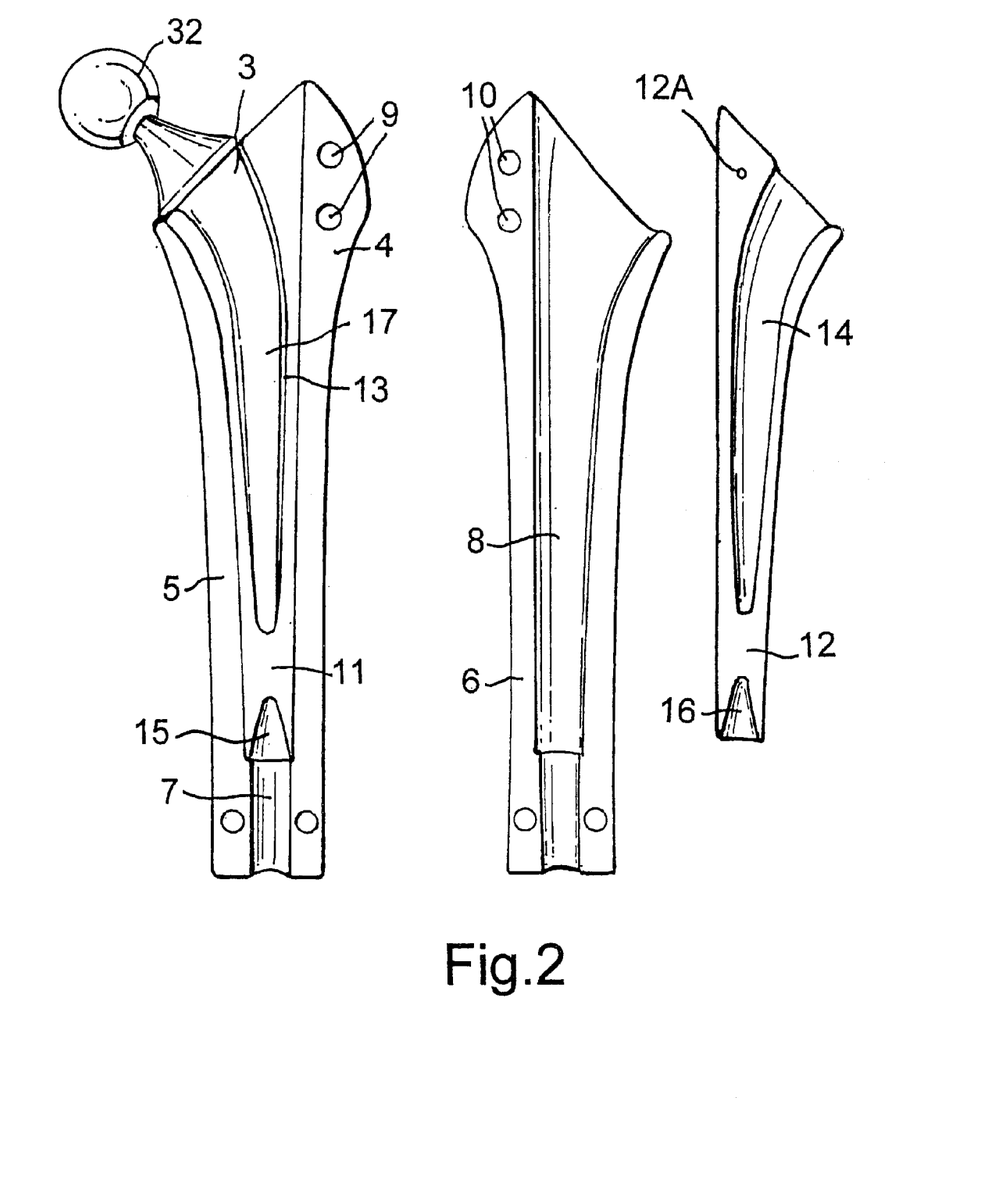
FIG. 2 is a view of partially assembled parts of the facsimile femur part.
Figure 5:
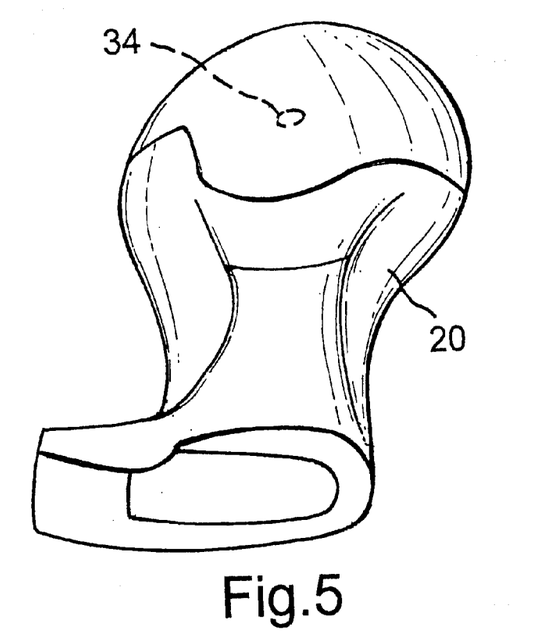
FIG. 5 is a view of a facsimile joint portion for connection to the facsimile femur part.

The femur part also includes a facsimile joint portion 20 (see FIG. 5) which can be releasably secured to the main portion 4 by the magnetic attraction of a magnet 33 embedded in the top of the shaft portion 17 which cooperates with a magnet 34 within the joint portion 20 (when the ball portion 32 is detached). The joint portion 20 is readily detachable from the main portion 4 to allow fitting of the shaft portion 17 of the prosthesis 3 within the sheath portion which serves to mimic the cement used for bonding the prosthesis within the femur, and to allow the tip of the shaft portion 17 with the ball portion 32 thereon to project from the end of the sheath portion, as best seen in FIG. 2. The two parts 11, 12 of the sleeve portion may be coloured or otherwise marked to indicate this function. An alternative sheath portion, comprising two parts of the same general shape as shown in FIG. 1, may be provided to be used in place of the parts 11, 12 in order to demonstrate an alternative surgical technique. The parts of the alternative sheath portion may have the same colour as the main portion, but may have roughened internal surfaces defining the channels, to mimic the roughening of the inside of the axial passage for receiving the shaft of the prosthesis as used in the alternative technique.

Figure 3:
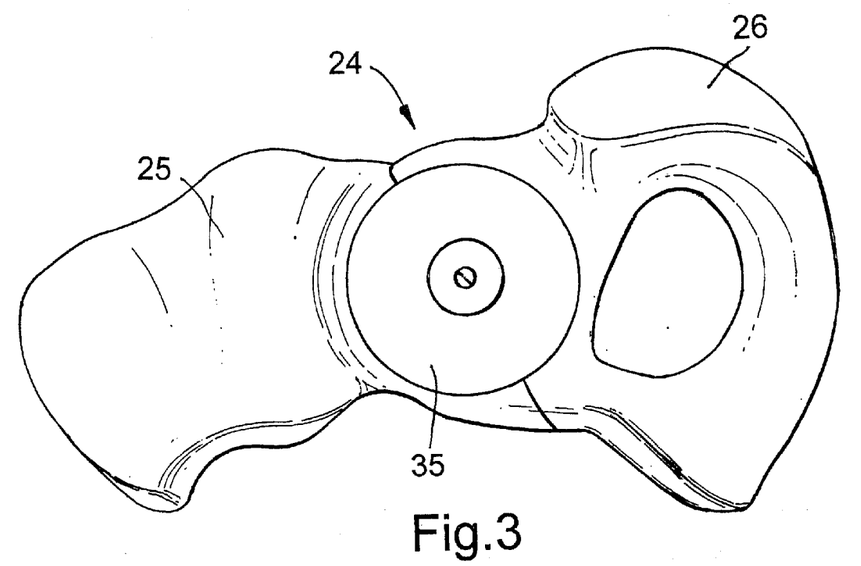
FIG. 3 is a view of a facsimile pelvis part, together with part of the prosthesis
Figure 4:
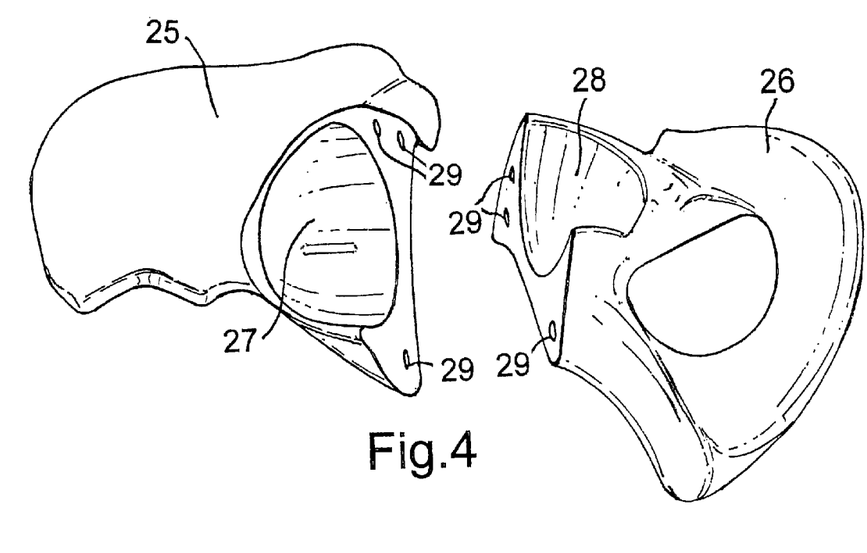
FIG. 4 is a view of disassembled parts of the facsimile pelvis part.
Figure 6:
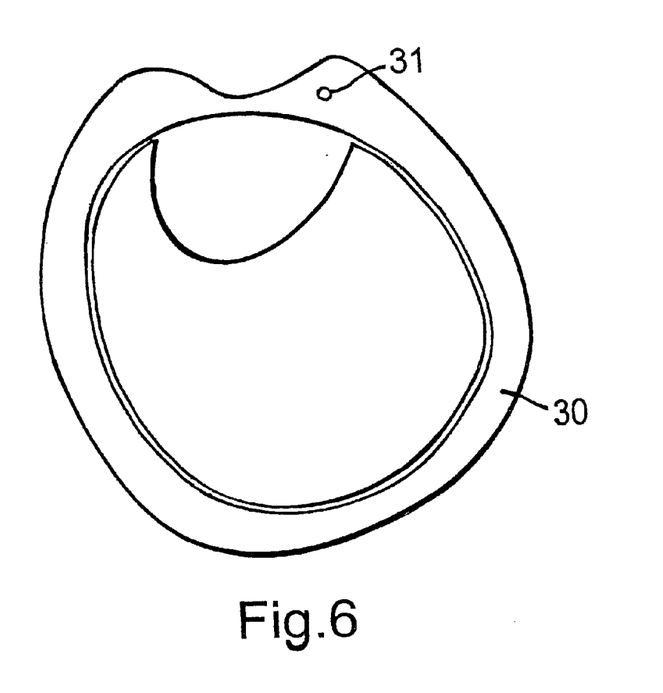
FIG. 6 is a view of a facsimile annular joint portion for attachment to the facsimile pelvis part.

Furthermore, as shown in FIG. 4, the pelvis part comprises two detachable portions 25, 26 having recesses 27, 28 which together form a socket for receiving the joint portion 20, when the portions 25, 26 are secured together by the magnetic attraction of embedded magnets 29. In addition the pelvis part 24 includes a facsimile annular joint portion 30, as shown in FIG. 6, releasably secured by the magnet attraction of embedded magnets 31 to the remainder of the pelvis part 24 in the vicinity of the socket. The annular joint portion 30 is readily detachable so as to mimic the surgical removal of the required portion of the bone to enable fitting of the prosthesis. After removal of the joint portion 30, the further part of the prosthesis in the form of a plastic cup bearing 35 (FIG. 3) is fitted within the socket, and the ball portion 32 on the end of the shaft portion 17 is force fitted into the cup bearing 35 within the socket to thereby simulate the connecting together of the femur and the pelvis by the prosthesis on completion of the hip replacement operation.

It will be appreciated that the various parts of the assembly may be separately removed in the required order to show different stages of the hip replacement technique. Furthermore with the required parts removed as indicated above, the aid can readily accept the correct orthopaedic prosthesis parts for both the femur and the pelvis. Once the demonstration of the orthopaedic techniques has been completed, the prosthesis can be removed and the detachable parts can be reattached so as to place the aid in its original state ready for reuse.

Figure 7:
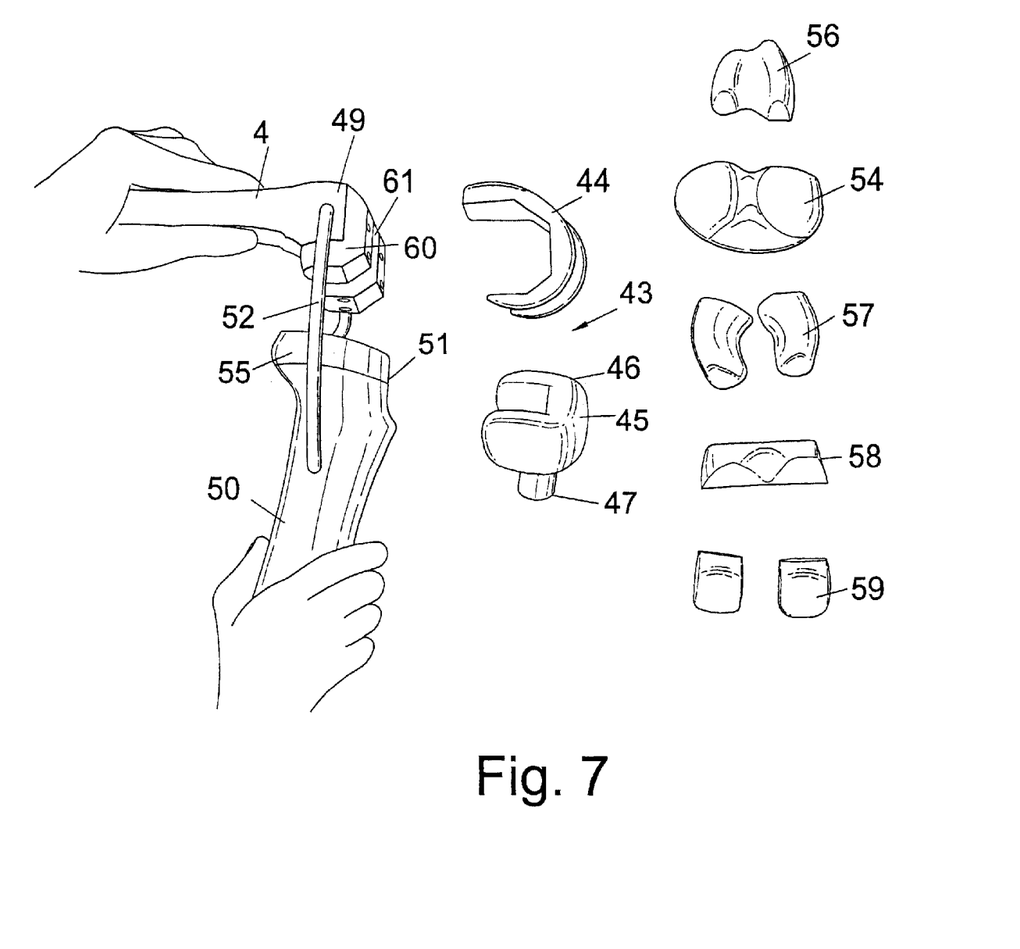
FIGS. 7, 8 and 9 are views of an aid with portions removed to allow fitting of three different types of prosthesis.

The second embodiment shown in the drawings is an orthopaedic knee replacement demonstration aid in the form of a facsimile of the human skeletal knee comprising a part of the femur and a part of the tibia connectable together in the correct anatomical positions. Referring to FIG. 7, a knee-replacement prosthesis 43 is shown for connecting together the femur part and the tibia part after removal of detachable portions of the two parts in a manner mimicking surgical removal of these parts in an actual knee replacement operation. The prosthesis 43 has a stainless steel femoral component 44 and a tibial component 45 having a Nylon head portion 46 and a stainless steel shaft portion 47.

The femur part is made up of a series of different pieces which are anatomically correct relative to the human femur in its natural form, when put together in the correct order. More particularly the femur part comprises an elongate main portion 4 having a joint portion 49 at one end, opposite the joint portion 20 of FIG. 5, the joint portion 49 having a number of detachable portions which are secured to the main portion by embedded magnets recessed into the two portions so that the portions are secured together by magnetic attraction. The tibia part comprises an elongate main portion 50 and a joint portion 51 also having detachable portions secured by the magnetic attraction of embedded magnets.

The femur part and the tibia part are shown in FIG. 7 connected together by an elasticated cord 52 imitating the action of ligaments, with certain of the detachable portions removed to mimic the surgical cuts required for the fitting of the femoral component 44 of the prosthesis to the femur part and the fitting of the tibial component 45 of the prosthesis to the tibia part. In this case a detachable portion 54 of the tibia part is shown removed from the joint portion 51 to allow fitting of the tibial component 45 with the shaft portion 47 extending within an axial passage provided in the joint portion 51. A further detachable portion 55 of the tibia part does not require to be removed in this case.

Furthermore a number of detachable portions are shown removed from the femur part to denote the different cuts required to accommodate fitting of the femoral component 44, including a detachable portion 56 simulating an anterior cut from the joint portion 49, two detachable portions 57 simulating distal cuts, a detachable portion 58 simulating an anterior chamfer, and two detachable portions 59 simulating posterior cuts combined with posterior chamfers. Two further detachable portions 60 and 61 are not required to be removed from the joint portion 49 in this operation, and the function of these further detachable portions will be apparent from the following description.

Figure 8:
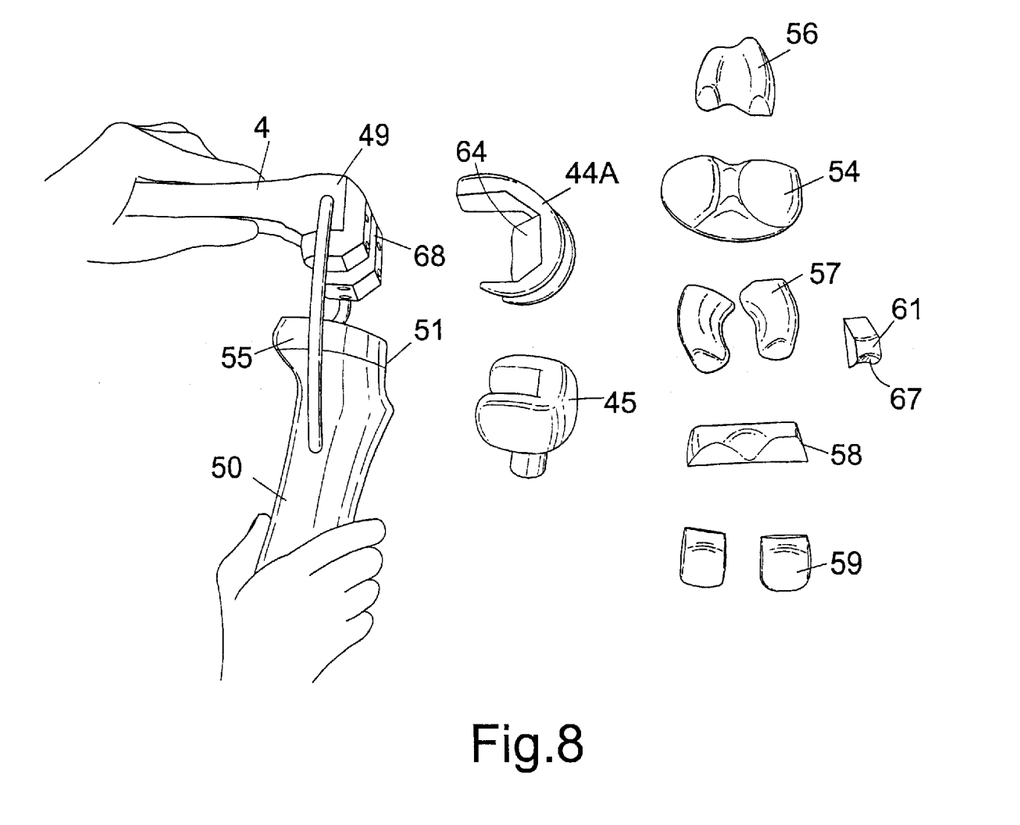

FIG. 8 shows the configuration of the femur and tibia parts for the case where the femoral component 44A of the prosthesis incorporates a box section 64 such as is required in a cruciate stabilised (CS) surgical procedure. Box section 64 is a cruciate retaining (CR) box section. This contrasts with the form of the femoral component 44 of the prosthesis required for the posterior stabilised (PS) surgical procedure which does not include a box section, as shown in FIG. 7. In the case of the CS surgical procedure of FIG. 8, the detachable portion 61 is shown detached from the joint portion 49 (although the detachable portions 60 and 55 are shown still attached to the joint portions 49 and 51 of the femur and tibia parts) simulating the effect of the CS cut effected during this surgical procedure. It will be seen that the detachable portion 61 is generally box-shaped having parallel side walls, but an inclined anterior wall 66 matching the anterior chamfer and a generally curved posterior wall 67 matching the posterior surface of the bone in the corresponding region. The slot 68 in the joint portion 49 formed by removal of the portion 61 serves to accommodate the box section 64 when the femoral component 44A is fitted to the joint portion 49 of the femur part.

Figure 9:
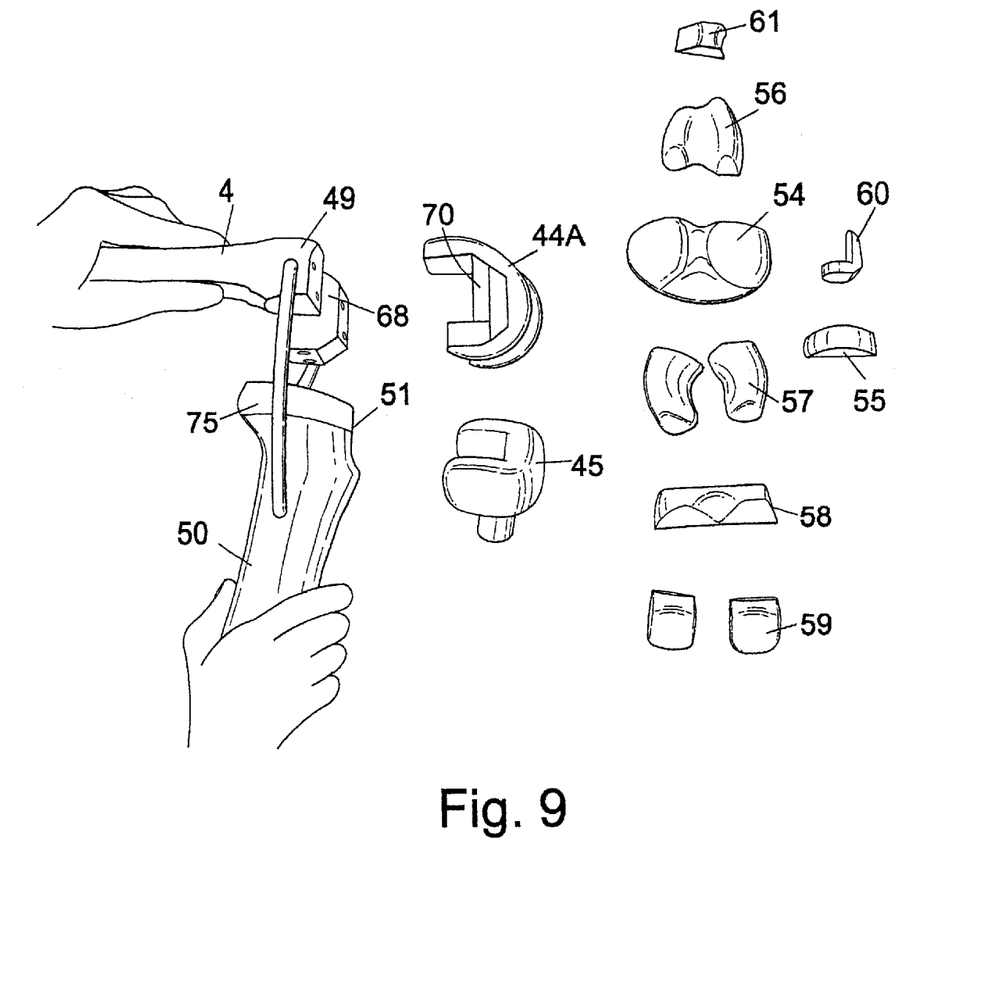

FIG. 9 shows the revision version 44B of the femoral part of the prosthesis having a box section 70 of increased depth relative to the box section 64 of the part 44A in FIG. 8. In this case the detachable portion 60 is shown removed from the joint portion 49 of the femur part, and the detachable portion 55 is shown removed from the joint portion 51 of the tibia part, leaving a recess 75 in one side of the joint portion 51, in order to simulate the further cuts required in the revision surgical procedure. The removal of these additional detachable portions 60 and 65 provides the necessary shape to accommodate the modified prosthesis required in this procedure.

Thus it will be appreciated that a single demonstration aid is usable to demonstrate the different cuts required in three different surgical knee replacement procedures.

It will be appreciated that the various parts of the assembly may be separately removed in the required order to show different stages of the knee replacement technique. Furthermore with the required parts removed as indicated above, the aid can readily accept the correct orthopaedic prosthesis parts for both the femur and the tibia. Once the demonstration of the orthopaedic techniques has been completed, the prosthesis can be removed and the detachable parts can be reattached so as to place the aid in its original state ready for reuse.

It will be appreciated that the number of detachable parts required in any particular demonstration aid will be dependent upon the orthopaedic implant techniques to be demonstrated. Furthermore various modifications of the above-described demonstration aid are possible to adapt it for demonstration of particular surgical orthopaedic techniques, and, in each case, the aid may be in the form of a facsimile of one or more bones or a portion of one or more bones. The aid may also be used to demonstrate other types of surgical techniques.

What is claimed is:

1. An orthopaedic skeletal joint demonstration aid for demonstrating the fitting to a skeletal joint of additional different versions of an orthopaedic prosthesis in different surgical techniques, the aid comprising:

a first facsimile skeletal part including a main portion and having at least one detachable portion which is detachable from the main portion to permit fitting of one part of a prosthesis thereto; and a second facsimile skeletal part including an elongate main portion and having at least one detachable portion which is detachable from the elongate main portion to permit fitting of another part of the prosthesis thereto, wherein the detachable portions of the second part include a generally box-shaped detachable portion which is detachably received within a slot in the elongate main portion to permit fitting of a version of the prosthesis part which does not incorporate a projecting box section and which is removable to permit fitting of a version of the prosthesis part which incorporates a projecting box section such that the projecting box section is received within the slot.

2. An aid as claimed in claim 1, wherein the detachable portions and the main portions are detachably connected together by magnetic attraction.

3. An aid as claimed in claim 1, wherein the main portion of the first part is elongate and has an axial passage.

4. An aid as claimed in claim 1, wherein the second facsimile skeletal part has the appearance of at least a joint portion of a femur.

5. An aid as claimed in claim 4, wherein the second facsimile skeletal part has said at least one detachable portion which is removable to permit fitting of a femoral prosthesis part which does not incorporate a box section.

6. An aid as claimed in claim 5, wherein the second facsimile skeletal part has a further detachable portion which is removable after removal of said at least one detachable portion to permit fitting of a femoral prosthesis part which incorporates a cruciate retaining (CR) box section.

7. An aid as claimed in claim 6, wherein the second facsimile skeletal part has a still further detachable portion which is removable after removal of said at least one detachable portion and said further detachable portion to permit fitting of a femoral prosthesis part which incorporates a revision box section.

8. An aid as claimed in claim 1, wherein the first facsimile skeletal part has the appearance of at least a joint portion of a tibia.

9. An aid as claimed in claim 8, wherein the first facsimile skeletal part has at least one detachable portion which is removable to uncover an axial passage for receiving a shaft of a tibial prosthesis part.

10. An aid as claimed in claim 8, wherein the first facsimile skeletal part has a further detachable portion which is removable after removal of said at least one detachable portion to permit fitting of an alternative tibial prosthesis part.

* * * * *